United States Patent
Kiuchi et al.

(10) Patent No.: US 9,190,873 B2
(45) Date of Patent: Nov. 17, 2015

(54) CONTROL SYSTEM, CORRECTION DEVICE, AND POWER CONTROL METHOD

(75) Inventors: Kazuya Kiuchi, Tokyo (JP); Kaoru Kusafuka, Tokyo (JP); Tadayuki Watanabe, Tokyo (JP); Kazumasa Shichiri, Tokyo (JP); Akinori Iwabuchi, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 89 days.

(21) Appl. No.: 13/512,584

(22) PCT Filed: Nov. 26, 2010

(86) PCT No.: PCT/JP2010/071153
§ 371 (c)(1),
(2), (4) Date: May 29, 2012

(87) PCT Pub. No.: WO2011/065498
PCT Pub. Date: Jun. 3, 2011

(65) Prior Publication Data
US 2012/0232711 A1 Sep. 13, 2012

(30) Foreign Application Priority Data
Nov. 30, 2009 (JP) .................................. 2009-272988

(51) Int. Cl.
*G05D 3/12* (2006.01)
*G06Q 30/00* (2012.01)
(Continued)

(52) U.S. Cl.
CPC .............. *H02J 13/0006* (2013.01); *H02J 3/38* (2013.01); *H02J 3/14* (2013.01); *H02J 3/32* (2013.01)

(58) Field of Classification Search
CPC ........... H02J 13/0006; H02J 3/38; H02J 3/32; H02J 3/14

USPC ......................................... 700/291; 705/26.2
See application file for complete search history.

(56) References Cited

U.S. PATENT DOCUMENTS 5,432,710 A * 7/1995 Ishimaru et al. ............... 705/412
5,528,507 A * 6/1996 McNamara et al. .......... 700/286
(Continued)

FOREIGN PATENT DOCUMENTS

CN 101436785 A 5/2009
JP 11-313441 A 11/1999
(Continued)

OTHER PUBLICATIONS

Hogan-W.W., "Contract Networks for Electric Power Transmission", Harward University, 1992, pp. 211-242.*
(Continued)

*Primary Examiner* — Robert Fennema
*Assistant Examiner* — Thomas Stevens
(74) *Attorney, Agent, or Firm* — Studebaker & Brackett PC

(57) ABSTRACT

Disclosed is a control system (10) provided with: a generation apparatus (220) for generating control information that is information based on demand and supply of power generated at a power plant (210), and that is to be used for controlling power at the location of consumers (301) of electric power to whom power generated at the power plant (210); and a correction apparatus (100a) for correcting the control information, taking into consideration either a distributed power supply or a storage battery that can supply power to a consumer group (300a) of electric power. Power control is executed at the location of the consumers who comprise the consumer group (300a) of electric power, using the corrected control information.

9 Claims, 7 Drawing Sheets

(51) Int. Cl.
*H02J 13/00* (2006.01)
*H02J 3/38* (2006.01)
*H02J 3/14* (2006.01)
*H02J 3/32* (2006.01)

(56) References Cited

U.S. PATENT DOCUMENTS

| | | | |
|---|---|---|---|
| 5,761,084 A * | 6/1998 | Edwards | 700/293 |
| 5,917,308 A * | 6/1999 | Brooke | 320/118 |
| 5,994,892 A * | 11/1999 | Turino et al. | 324/142 |
| 7,043,380 B2 * | 5/2006 | Rodenberg et al. | 702/62 |
| 7,218,998 B1 * | 5/2007 | Neale | 700/295 |
| 7,418,428 B2 * | 8/2008 | Ehlers et al. | 705/63 |
| 8,234,876 B2 * | 8/2012 | Parsonnet et al. | 62/59 |
| 2003/0080876 A1 * | 5/2003 | Martin | 340/870.02 |
| 2005/0116814 A1 * | 6/2005 | Rodgers et al. | 340/310.01 |
| 2005/0231869 A1 * | 10/2005 | Yoshikawa et al. | 361/62 |
| 2006/0125422 A1 * | 6/2006 | Costa | 315/294 |
| 2006/0195230 A1 * | 8/2006 | Lenarduzzi et al. | 700/292 |
| 2009/0012916 A1 * | 1/2009 | Barnett | 705/412 |
| 2009/0093916 A1 * | 4/2009 | Parsonnet et al. | 700/286 |
| 2009/0157835 A1 | 6/2009 | Thompson et al. | |
| 2009/0256686 A1 * | 10/2009 | Abbot et al. | 340/310.11 |
| 2010/0308765 A1 * | 12/2010 | Moore et al. | 320/103 |
| 2011/0173109 A1 * | 7/2011 | Synesiou et al. | 705/34 |

FOREIGN PATENT DOCUMENTS

| | | |
|---|---|---|
| JP | 2002-262458 A | 9/2002 |
| JP | 2003-199249 A | 7/2003 |
| JP | 2003-259552 A | 9/2003 |
| JP | 2005-033952 A | 2/2005 |
| JP | 2005-198423 A | 7/2005 |

OTHER PUBLICATIONS

Ipakchi et al., "Grid of the Future" IEEE, Mar./Apr. 2009,pp. 51-62.*
Yeung et al., "Utilities and Two-Way Customer Communications Systems", IEEE communications magazine, 1995, pp. 33-38.*
International Search Report; PCT/JP2010/071153; Feb. 22, 2011, 2 pages.
An Office Action; "Notice of Reason for Rejection," issued by the Japanese Patent Office on Nov. 5, 2013, which corresponds to Japanese Patent Application No. 2011-543329 and is related to U.S. Appl. No. 13/512,584; with English statement of relevance, 3 pages.
The first Office Action issued by the Chinese Patent Office on Jan. 24, 2014, which corresponds to Chinese Patent Application No. 201080049587.5 and is related to U.S. Appl. No. 13/512,584; with English language concise explanation, 8 pages.
An Office Action; "Notice of Reasons for Rejection," issued by the Japanese Patent Office on Jan. 20, 2015, which corresponds to Japanese Patent Application No. 2014-085924 and is related to U.S. Appl. No. 13/512,584; with English language statement of relevance, 6 pages.
The extended European search report issued by the European Patent Office on Jan. 9, 2015, which corresponds to European Patent Application No. 10833343.6-1806 and is related to U.S. Appl. No. 13/512,584, 6 pages.
Communication pursuant to Rules 70(2) and 70a(2) EPC issued by the European Patent Office on Jan. 27, 2015, which corresponds to European Patent Application No. 10833343.6-1806 and is related to U.S. Appl. No. 13/512,584, 1 pages.

* cited by examiner

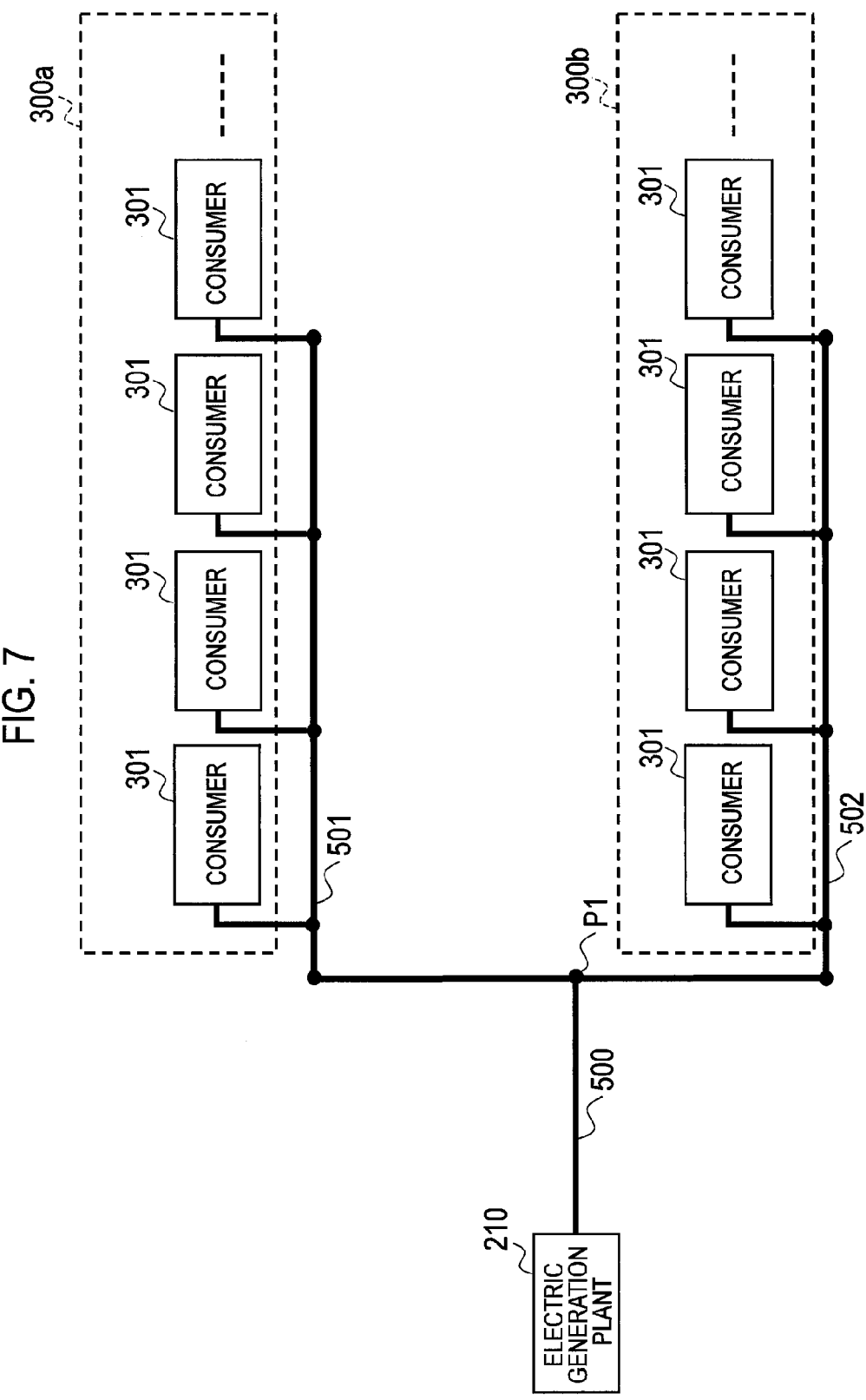

… (1) …

CONTROL SYSTEM, CORRECTION DEVICE, AND POWER CONTROL METHOD

TECHNICAL FIELD

The present invention relates to a control system, a correction device, and a power control method for performing power control at a consumer end.

BACKGROUND ART

Here, the "Smart grid technologies" that make use of the information and communications technology and incorporate power consumers (hereinafter, simply referred to as consumers) to effectively control the electric power draw attention.

As an application example of the smart grid technologies, there is a method of remotely instructing power control carried out at a consumer end. For example, there has been proposed a method for notifying the consumer, from the electric power company, of the control information for restricting power consumption at a consumer end, during peak demand of electric power (see Patent Document 1). According to such a method, along with a reduction in the cost of power generation of the electric generation plant, stable operation of the electric generation plant can also be achieved.

PRIOR ART DOCUMENT

Patent Document

Patent Document 1: Japanese Unexamined Patent Application Publication No. H11-313441

SUMMARY OF THE INVENTION

In the recent years, due to an increase in the awareness of the global environment, the introduction of dispersed power sources and batteries is progressing. A consumer who can make use of dispersed power sources and batteries receives the supply of electric power from an electric generation plant (that is, an electric power company), and at the same time, can receive the supply of electric power from the dispersed power source and the battery.

However, according to the method described in Patent Document 1, because the control information is notified from the electric power company to the consumer without taking into consideration the dispersed power sources and batteries, the problem is that electric power cannot always be controlled appropriately.

It is therefore an object of the present invention to provide a control system, a correction device, and a power control method, by which it is possible to provide appropriate power control even to a consumer who can use dispersed power sources and batteries.

To solve the above problem, the present invention has following features. A first feature of the present invention is summarized as a control system (control system 100), comprising: a generation device (generation device 220) configured to generate the control information that is the information based on supply and demand of power generated at an electric generation plant (electric generation plant 210), and is used for power control in a plurality of consumers (consumers 301) supplied with the power generated at the electric generation plant, a correction device (correction device 110a, for example) configured to correct the control information generated by the generation device in view of at least one of a dispersed power source or a battery that can supply electric power to a consumer group (consumer group 300a, for example), which is a part of the plurality of consumers, and a control device (control device 320) configured to perform power control by a consumer configuring the consumer group by using the control information corrected by the correction device.

According to the feature above, the correction device corrects the control information in view of at least one of a dispersed power source and a battery that can supply electric power to a consumer group, which is a part of a plurality of consumers supplied with the electric power generated at an electric generation plant, and therefore, it is possible for the control device to provide appropriate power control even to a consumer who can use dispersed power sources or batteries.

A second feature of the present invention according to the first feature of the present invention is summarized as that the correction devices are individually provided to a plurality of consumer groups, and the individual correction devices are connected to the generation device.

A third feature of the present invention according to the first feature of the present invention is summarized as that the correction device corrects the control information generated by the generation device in accordance with the amount of electric power that can be supplied by at least one of the dispersed power source or the battery.

A fourth feature of the present invention according to the first feature of the present invention is summarized as that the consumer group is formed by one of the consumers belonging to the same region, consumers sharing the same battery, and consumers connected to the same electric feeder line.

A fifth feature of the present invention according to the first feature of the present invention is summarized as that the control device performs power control in each consumer or each load.

A sixth feature of the present invention according to the first feature of the present invention is summarized as that the control information includes information indicating electricity prices of the power generated at the electric generation plant, information indicating a suppliable amount of the power generated at the electric generation plant, or information indicating a usable amount of the power in the consumer which is generated at the electric generation plant.

A seventh feature of the present invention is summarized as a correction device, comprising: a reception unit (reception unit 111) configured to receive from a generation device the control information that is the information based on the supply and demand of the power generated at an electric generation plant, and is used for power control in a plurality of consumers supplied with the power generated at the electric generation plant, a correction unit (correction unit 121) configured to correct the control information received by the reception unit in view of at least one of a dispersed power source and a battery that can supply electric power to a consumer group, which is a part of the plurality of consumers, and a transmission unit (transmission unit 112) configured to transmit the control information corrected by the correction unit to a control device performing power control by a consumer configuring the consumer group.

An eight feature of the present invention is summarized as a power control method, comprising: a step of generating the control information by a generation device, wherein the control information is information based on the supply and demand of the power generated at an electric generation plant, and is used for power control in a plurality of consumers supplied with the power generated at the electric generation plant, a step of correcting the control information generated in the generating step by a correction device in view of at least one of a dispersed power source or a battery that can supply electric power to a consumer group, which is a part of the plurality of consumers, and a step of performing power control by a control device by a consumer configuring the consumer group by using the control information corrected in the correcting step.

According to the present invention, it is possible to provide a control system, a correction device, and a power control method, by which is it possible to provide appropriate power control even to a consumer who can use dispersed power sources and batteries.

BRIEF DESCRIPTION OF THE DRAWINGS

FIG. 7 is a diagram for explaining a second modification of the embodiment of the present embodiment.

MODES FOR CARRYING OUT THE INVENTION

Figure 1:
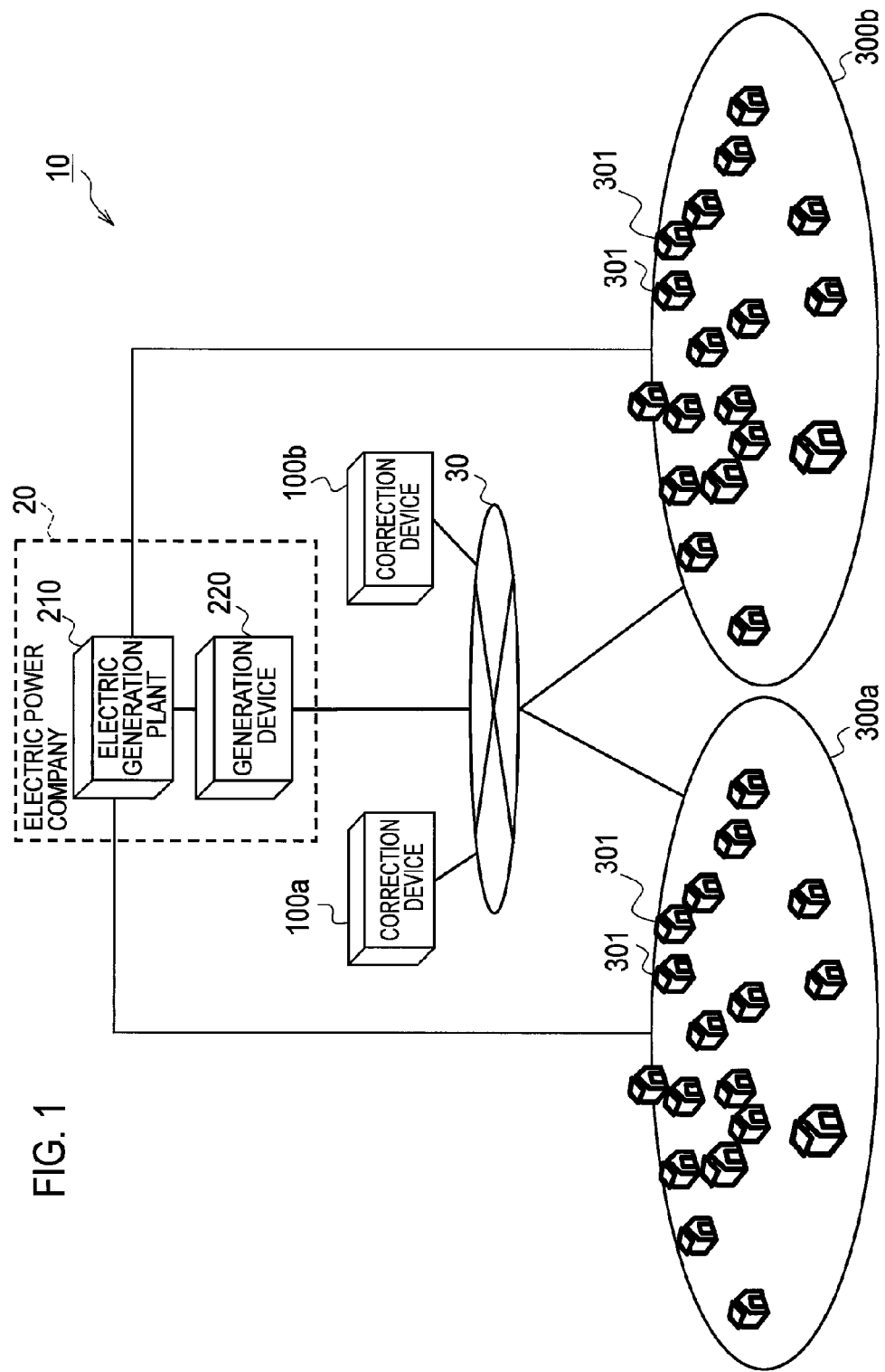
FIG. 1 is a schematic configuration diagram of a control system according to an embodiment of the present invention.

Next, an embodiment of the control system according to the present invention is explained with reference to drawings. Specifically, (1) Schematic configuration of control system, (2) Configuration of consumer, (3) Configuration of correction device, (4) Operation of control system, and (5) Other embodiments are explained. In all drawings for explaining the following embodiments, the same or similar reference numerals are used to designate the same or similar elements.

(1) Schematic Configuration of Control System

FIG. 1 is a schematic configuration diagram of a control system 10 according to the present embodiment.

As shown in FIG. 1, the control system 10 includes an electric power company 20, a plurality of correction devices 100a and 100b, and a plurality of consumers 301. An electric generation plant 210 is a large facility that generates power through steam-power generation, water-power generation, atomic power generation, wind-power generation, or photovoltaic power generation. The electric generation plant 210 supplies electric power to a wide area, for example, each local region (such as the Kanto region and the Tohoku region). In the example shown in FIG. 1, each consumer 301 receives the supply of electric power generated at the electric generation plant 210.

Each consumer 301 can control electric power. In the present embodiment, each consumer 301 controls power consumption of the load in the consumer. Furthermore, a photovoltaic cell 311 (see FIG. 2) is set up as a dispersed power source to each consumer 301.

However, not only a dispersed power source, but a battery can also be set up to each consumer 301. In such a case, each consumer 301 can control charge and discharge of the battery as power control.

A generation device 220 of the electric power company 20 is connected to a communication network 30 (for example, the Internet). The generation device 220 generates the control information that is the information based on the supply and demand of the electric power generated at the electric generation plant 210 and is used for power control by each consumer 301 supplied with the electric power generated at the electric generation plant 210.

The control information is information indicating electricity prices of the power generated at the electric generation plant 210 (hereinafter, the charges information), information indicating a suppliable amount of power generated at the electric generation plant 210 (hereinafter, the suppliable amount information), or information indicating an usable amount of power in the consumer which is generated at the electric generation plant 210 (hereinafter, the usable amount information). Note that an already known method can be used as a method of generating the control information.

The control information is transmitted to the correction devices 100a and 100b via the communication network 30. The correction device 100a is provided in correspondence to a consumer group 300a and the correction device 100b is provided in correspondence to a consumer group 300b. The correction device 100a corrects the control information in view of the dispersed power source and the battery that can supply power to the consumer group 300a. The correction device 100b corrects the control information in view of the dispersed power source and the battery that can supply power to the consumer group 300b.

In the present embodiment, the consumer group 300a is a group including the consumers 301 belonging to a particular region (such as a city, town, or village). The consumer group 300b is a group including the consumers 301 belonging to another region (such as a city, town, or village).

Following is the main reason for thus grouping the consumers 301. Specifically, because the amount of power generated by a photovoltaic cell, as a dispersed power source, varies in accordance with the weather (duration of sunshine), power control in each region preferably is performed in accordance with the weather of each region. Furthermore, even when wind-power generation or water-power generation is used as the dispersed power source, power control preferably is performed for each region for the same reason as that for a photovoltaic cell.

The control information corrected by the correction device 100a is transmitted to each consumer 301 that configures the consumer group 300a via the communication network 30. The control information corrected by the correction device 100b is transmitted to each consumer 301 that configures the consumer group 300b via the communication network 30.

Each consumer 301 configuring the consumer group 300a controls the power by using the control information corrected by the correction device 100a. Each consumer 301 configuring the consumer group 300b controls the power by using the control information corrected by the correction device 100b.

(2) Configuration of Consumer

Figure 2:
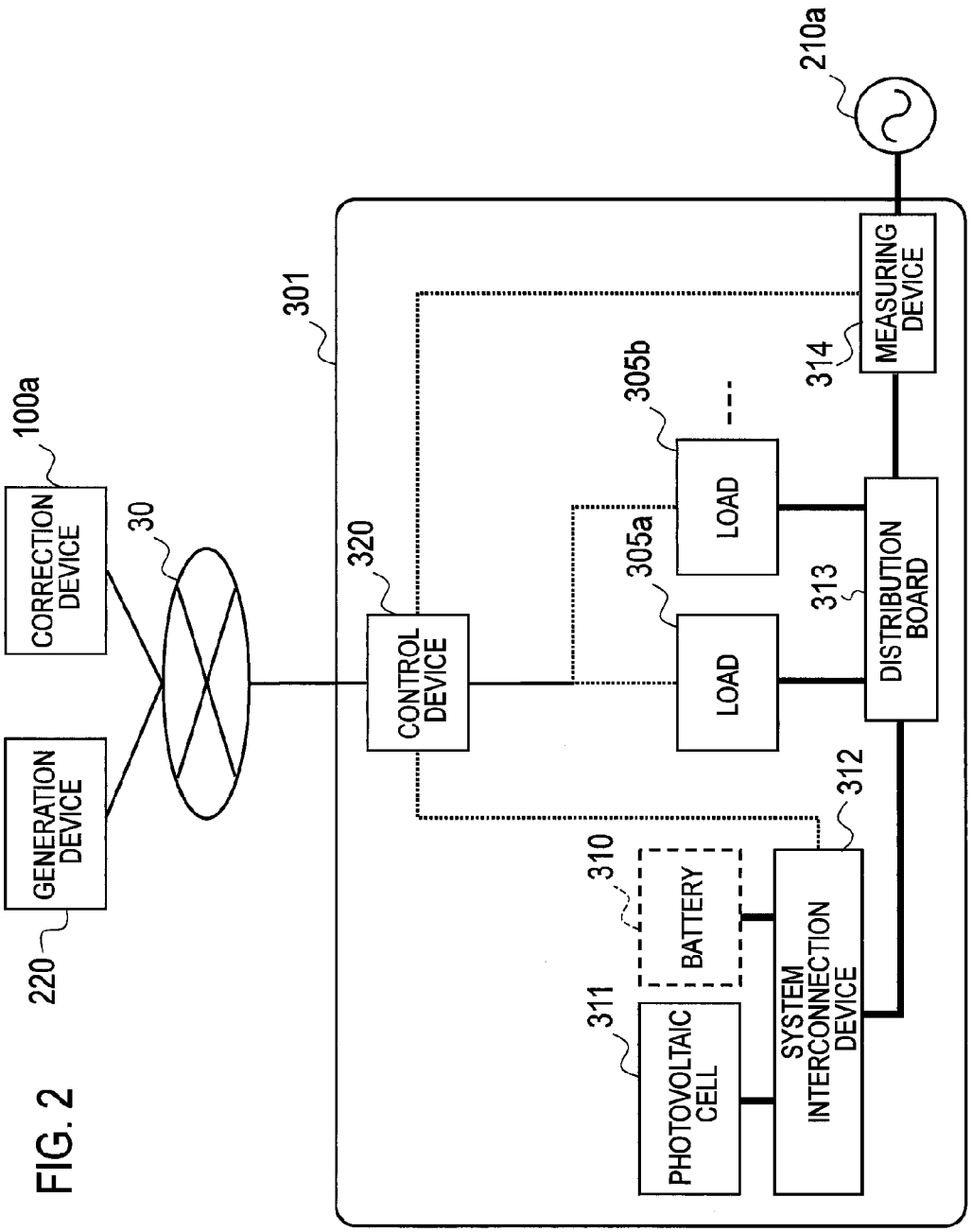
FIG. 2 is a block diagram showing a configuration example of a consumer according to the embodiment of the present invention.

FIG. 2 is a block diagram showing a configuration example of the consumer 301. FIG. 2 illustrates each consumer 301 configuring the consumer group 300a.

As shown in FIG. 2, AC power is supplied to the consumer 301 from a power system 210a including the electric generation plant 210. The consumer 301 includes a photovoltaic cell 311, a system interconnection device 312, a distribution board 313, loads 305a, 305b, . . . , a measuring device 314, and a control device 320. Note that the consumer 301 may include a battery 310 that stores the electric power generated by the photovoltaic cell 311 and the electric power supplied from the power system 210a.

The photovoltaic cell 311 receives solar light, and generates DC power in accordance with the received solar light. The system interconnection device 312 performs conversion between AC and DC power. Specifically, the system interconnection device 312 converts the DC power from the photovoltaic cell 311 to AC power, and interconnects with the power system 210a. The distribution board 313 distributes the AC power from the system interconnection device 312 and the power system 210a to the loads 305a, 305b, . . . . The loads 305a, 305b, . . . are devices consuming electric power, for example, household electrical appliances. The measuring device 314 measures the amount of power consumption of the loads 305a, 305b, . . . .

The control device 320 performs power control in the consumer 301. The control device 320 communicates with the loads 305a, 305b, . . . , the system interconnection device 312, and the measuring device 314. The communications can be radio communications or wire communications. In the case of radio communications, for example, Zigbee, which is one of the short-range radio communications standards for household electric appliances, can be used. In the case of wire communications, for example, PLC (Power Line Communications), which is a technique in which a power line is used as a communication line, can be used.

The control device 320 can communicate with the correction device 100a via the communication network 30. The control device 320 notifies the information about the amount of power generated by the photovoltaic cell 311 (hereinafter, the power generation amount information) and the information about the remaining battery amount of the battery 310 (hereinafter, the remaining battery amount information) to the correction device 100a.

The control device 320 performs power control by using the control information after correction that is received from the correction device 100a. The content of power control varies depending on the content of the control information. Hereinafter, an example of the method of power control is explained, however, other methods can also be used.

Firstly, when the control information is the charges information, the control device 320 performs control to restrict the amount of power consumption of the loads 305a, 305b, . . . (such as setting the operation mode of the loads 305a, 305b, . . . to power save mode) when the electricity charges are higher than a predetermined amount, for example. When the battery 310 is set up in the consumer 301, the control device 320 may control so that the battery 310 is actively charged from the power system 210a when the electricity charges are lower than a predetermined amount, and the control device 320 may control the discharge of the battery 310 so that the power is actively fed back from the battery 310 to the power system 210a when the electricity charges are higher than a predetermined amount.

Secondly, when the control information is the suppliable amount information, the control device 320 performs control to restrict the amount of power consumption of the loads 305a, 305b, . . . (such as setting the operation mode of the loads 305a, 305b, . . . to power save mode) when the suppliable amount is lower than a predetermined amount, for example. When the battery 310 is set up in the consumer 301, the control device 320 may control so that the battery 310 is actively charged from the power system 210a when the suppliable amount is more than a predetermined amount, and the control device 320 may control the discharge of the battery 310 so that the power is actively fed back to the power system 210a when the suppliable amount is lesser than a predetermined amount.

Thirdly, when the control information is the usable amount information, the control device 320 performs control to restrict the amount of power consumption of the loads 305a, 305b, . . . (such as setting the operation mode of the loads 305a, 305b, . . . to power save mode) such that the usable amount is not exceeded, for example. When the battery 310 is set up in the consumer 301, the control device 320 may control so that the battery 310 is actively charged from the power system 210a when the usable amount is more than a predetermined amount, and the control device 320 may control the discharge of the battery 310 so that the power is actively fed back from the battery 310 to the power system 210a when the usable amount is lesser than a predetermined amount.

(3) Configuration of Correction Device

Figure 3:
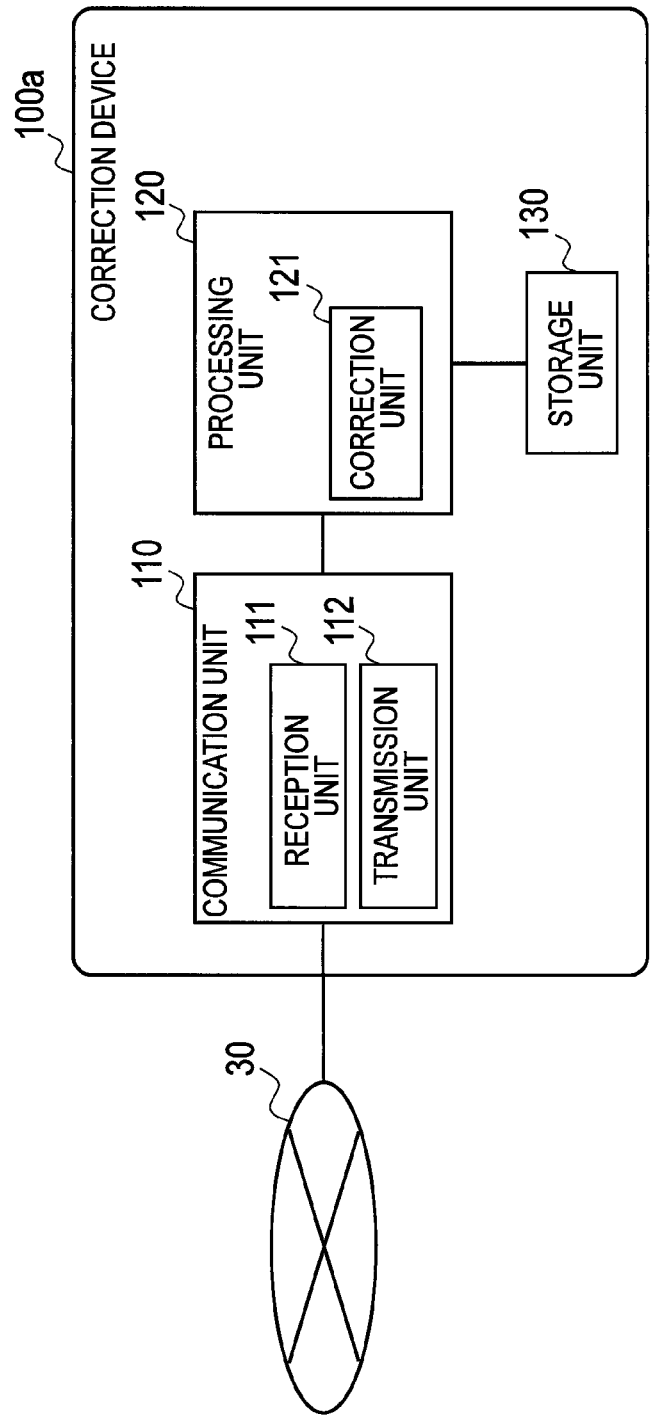
FIG. 3 is a block diagram showing a configuration example of a correction device according to the embodiment of the present invention.

FIG. 3 is a block diagram showing a configuration example of the correction device 100a. The correction device 100b is configured in the same way as the correction device 100a. Therefore, the description about the configuration of the correction device 100b will be omitted.

As shown in FIG. 3, the correction device 100a includes a communication unit 110, a processing unit 120, and a storage unit 130. The communication unit 110 communicates with each consumer 301 configuring the consumer group 300a via the communication network 30. The processing unit 120 performs a process according to a program stored in the storage unit 130. The storage unit 130 stores the program executed by the processing unit 120, and at the same time, the storage unit 130 is used as a work area during the execution of the program in the processing unit 120.

The communication network 30 includes a reception unit 111 and a transmission unit 112. The processing unit 120 includes a correction unit 121.

The reception unit 111 receives the control information from the generation device 220 via the communication network 30. The reception unit 111 receives the power generation amount information and the remaining battery amount information from the control device 320 of each consumer 301 via the communication network 30.

The correction unit 121 corrects the control information received by the reception unit 111 based on the (total value or average value of the) power generation amount information and the (total value or average value of the) remaining battery amount information received by the reception unit 111. The content of correction varies depending on the content of the control information. Hereinafter, an example of the correction method is explained, however, other methods can also be used.

Firstly, when the control information is the charges information, the control device 320 corrects to reduce the charges information when at least either of the power generation amount or the remaining battery amount is more than a predetermined amount, for example. By thus correcting, for example, the control for restricting the amount of power consumption of the loads 305a, 305b, . . . (such as setting the operation mode of the loads 305a, 305b, . . . to power save mode) can be prevented in the control device 320.

Secondly, when the control information is the suppliable amount information, the control device 320 corrects to increase the suppliable amount information when at least either of the power generation amount or the remaining battery amount is more than a predetermined amount, for example. By thus correcting, for example, the control for restricting the amount of power consumption of the loads 305a, 305b, . . . (such as setting the operation mode of the loads 305a, 305b, . . . to power save mode) can be prevented in the control device 320.

Thirdly, when the control information is the usable amount information, the control device 320 corrects to increase the usable amount information when at least either of the power generation amount or the remaining battery amount is more than a predetermined amount, for example. By thus correcting, for example, the use of the generated power or the stored power can be preferentially promoted in the control device 320.

The transmission unit 112 transmits the control information corrected by the correction unit 121 to the control device 320.

(4) Operation of Control System

Figure 4:
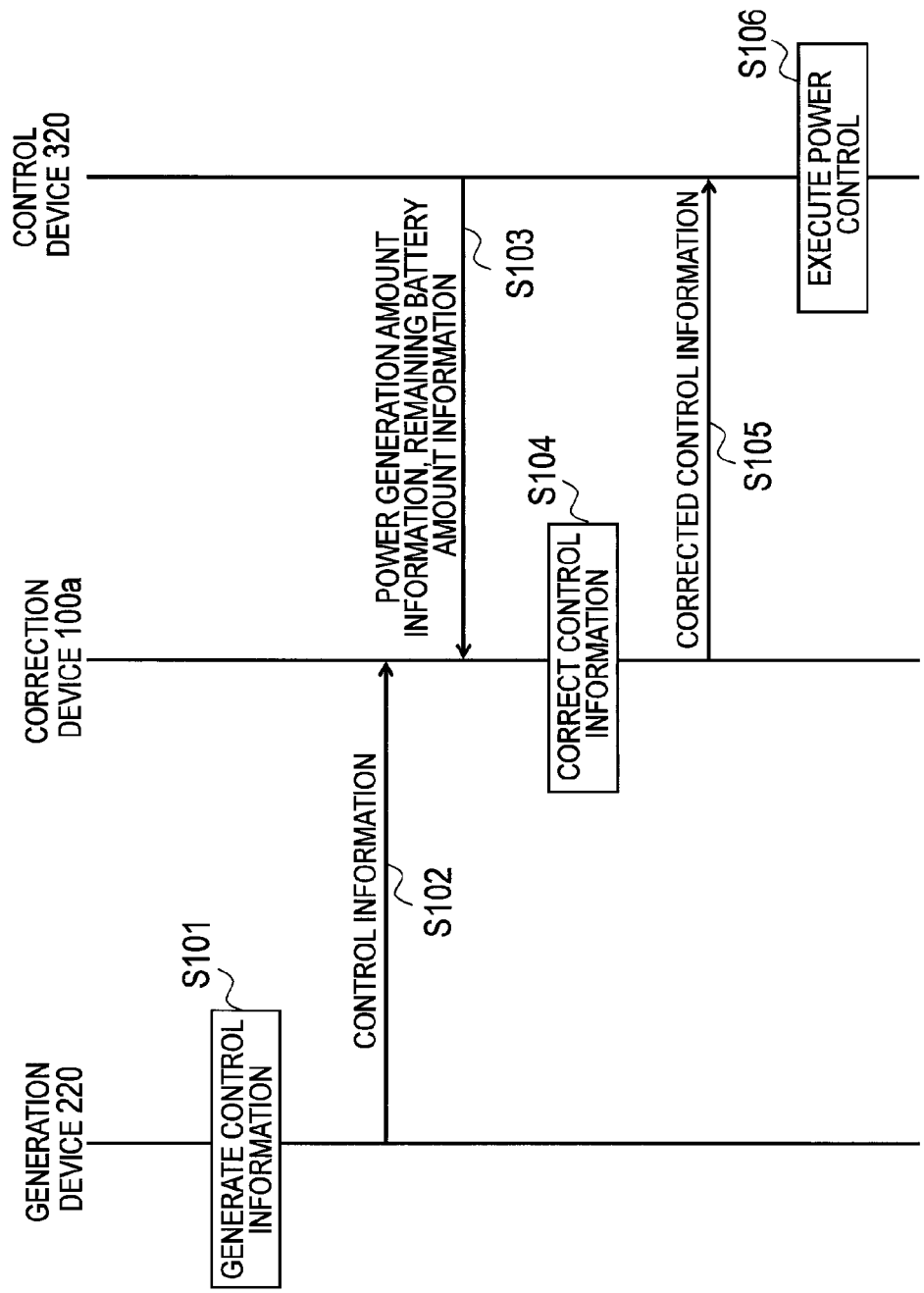
FIG. 4 is a sequence diagram showing an operation of the control system according to the embodiment of the present invention.

FIG. 4 is a sequence diagram showing an operation of the control system 10. The correction device 100b operates in the same way as the correction device 100a. Therefore, the description about the operation of the correction device 100b will be omitted.

In step S101, the generation device 220 generates the control information. For example, the control information can be calculated by the following calculation formula:

Control information=power supplying capability×
power demand×α

Here α is any coefficient.

In step S102, the generation device 220 transmits the control information to the correction device 100a. The reception unit 111 of the correction device 100a receives the control information.

The control information can be generated and transmitted either periodically or only when power control needs to be performed.

In step S103, the control device 320 transmits the power generation amount information and the remaining battery amount information to the correction device 100a. The reception unit 111 of the correction device 100a receives the control information.

The power generation amount information and the remaining battery amount information can be transmitted either periodically or in response to a request from the correction device 100a.

In step S104, the correction unit 121 of the correction device 100a corrects the control information. For example, the corrected control information can be calculated by the following calculation formula:

Corrected control information=control information×
(power generation amount of the consumer
group+remaining battery amount of the consumer group)×β

Here β is any coefficient.

In step S105, the transmission unit 112 of the correction device 100a transmits the corrected control information to the control device 320.

In step S106, the control device 320 performs power control by using corrected control information received from the correction device 100a.

Note that in the present embodiment, a case of two consumer groups was illustrated, however, there may be three or more consumer groups. When there are three or more consumer groups, three or more correction devices may be provided.

(5) Other Embodiments

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

(5.1) First Modification

In the aforementioned embodiment, each consumer 301 that receives the supply of electric power generated at the electric generation plant 210 was grouped based on the region. In the present modification, rather than grouping based on the region, each consumer sharing the same battery is grouped as a single consumer group.

Figure 5:
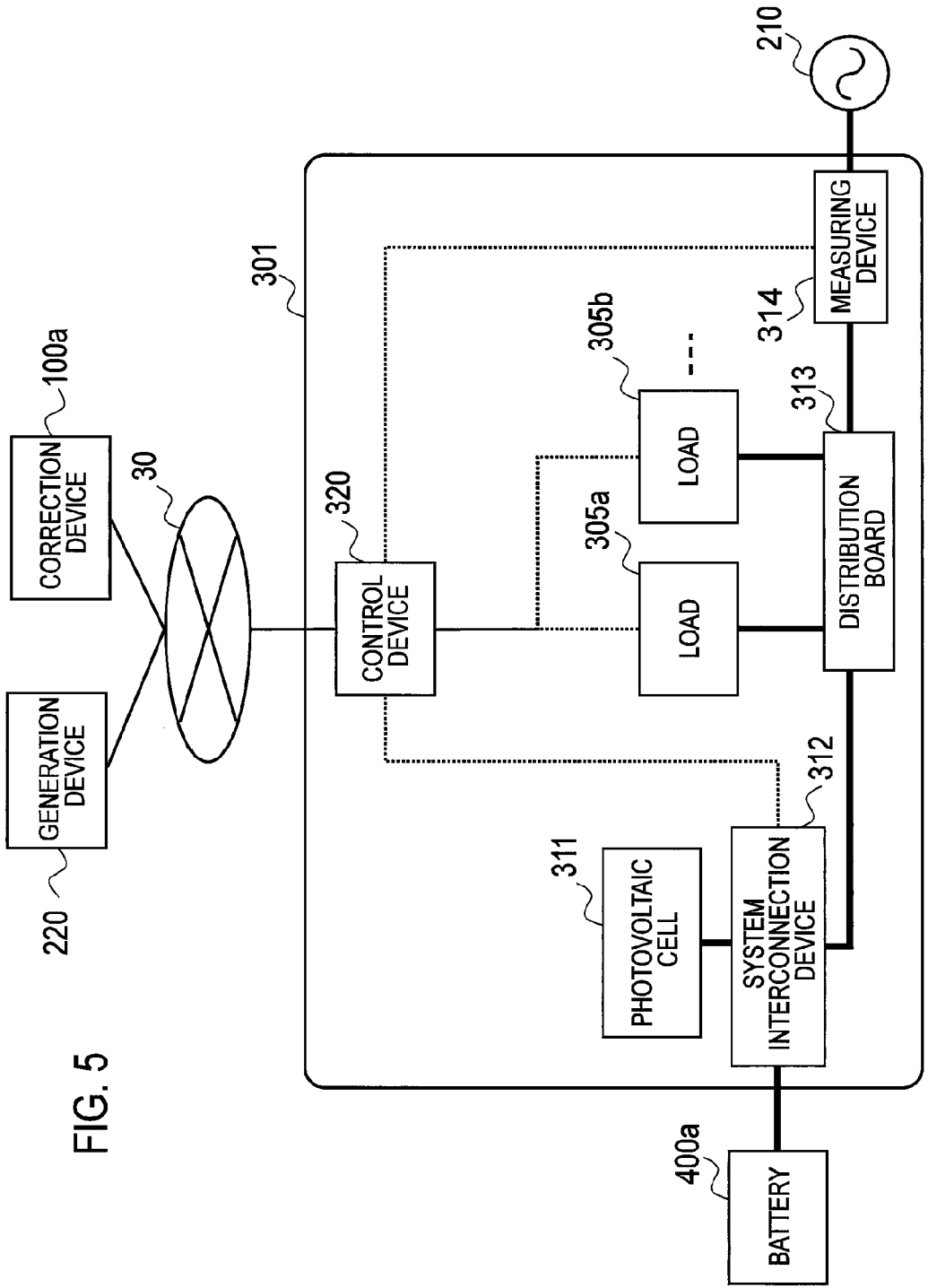
FIG. 5 is a block diagram showing a configuration example of a consumer according to a first modification of the embodiment of the present invention.
Figure 6:
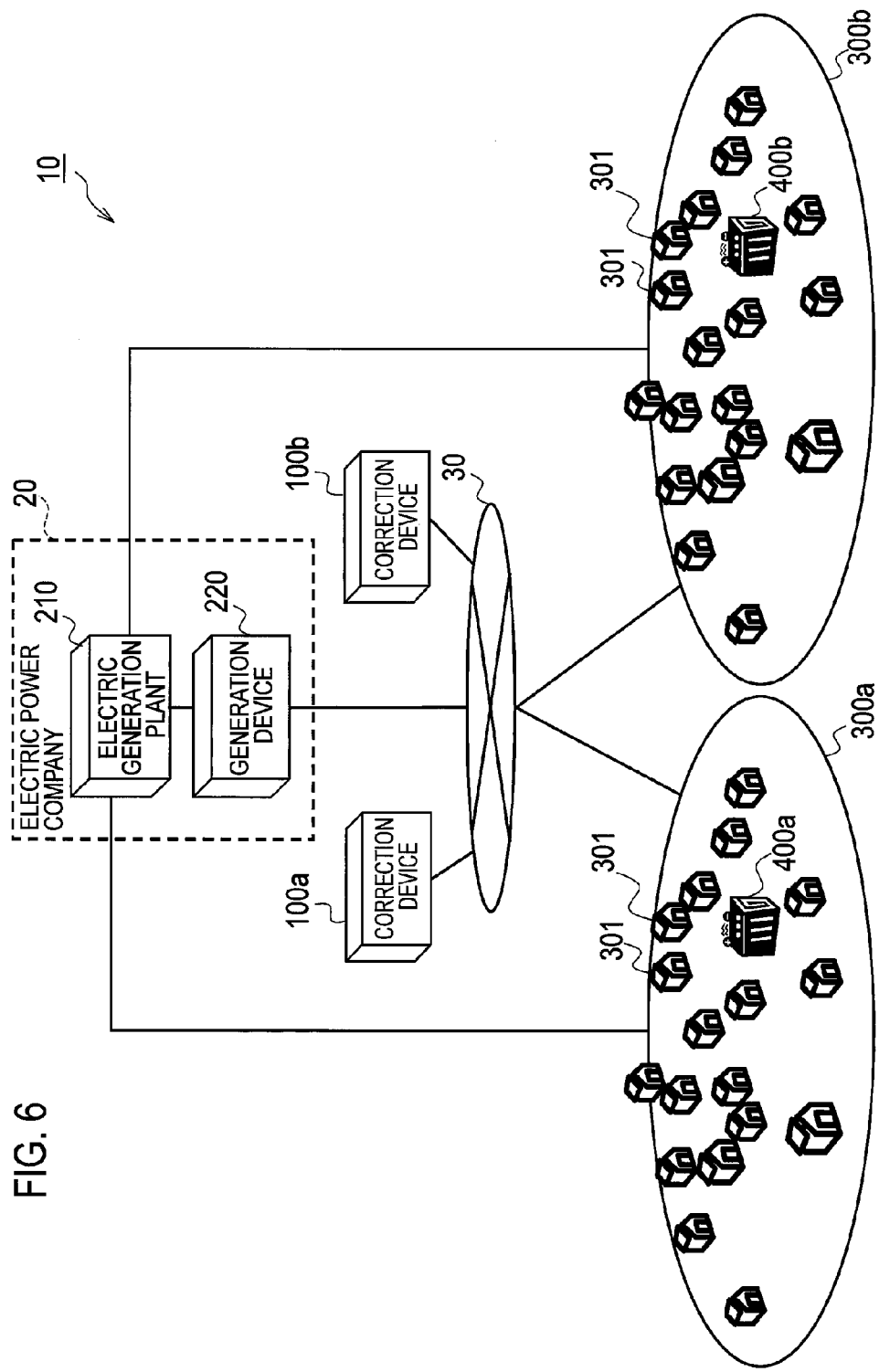
FIG. 6 is a schematic configuration diagram of a control system according to the first modification of the embodiment of the present invention.

A battery is comparatively an expensive item. Therefore, it is assumed that a plurality of consumers share a single battery. For example, as shown in FIG. 5, a case in which the consumer 301 can use a remote battery 400a is assumed. In such a case, each consumer sharing the same battery is grouped as a single consumer group, and performing power control for each consumer group is effective.

FIG. 5 is a schematic configuration diagram of the control system 10 according to the present modification. In the present modification, the consumer group 300a is a group including each consumer 301 that shares the battery 400a. The consumer group 300b is a group including each consumer 301 that shares the battery 400b. The correction device 100a corrects the control information in view of the remaining battery amount of the battery 400a. The correction device 100b corrects the control information in view of the remaining battery amount of the battery 400b.

By thus grouping the consumers 301, power control can be implemented for each consumer 301 configuring the consumer group 300a in view of the remaining battery amount of the battery 400a, and power control can be implemented for each consumer 301 configuring the consumer group 300b in view of the remaining battery amount of the battery 400b.

(5.2) Second Modification

In the aforementioned embodiment, each consumer 301 that receives the supply of electric power generated at the electric generation plant 210 was grouped based on the region. In the present modification, rather than grouping based on the region, each consumer connected to the same electric feeder line is grouped as a single consumer group. Note that not only the electric feeder line, but each consumer connected to the same distribution line may be grouped as a single consumer group.

As shown in FIG. 7, the electric distribution network that distributes power from the electric generation plant 210 to each consumer 301 includes an electric power line 500 from the electric generation plant 210 up to the branching point P1, and electric power lines 501, 502, . . . extending from the branching point P1. Because the electric power distributed using the electric power line 501 is limited, and the electric power distributed using the electric power line 502 is limited, each consumer connected to the same electric power line is grouped as a single consumer group, and performing power control for each consumer group is effective.

In the example shown in FIG. 7, a consumer group 300a is a group including each consumer 301 connected to the electric power line 501. The consumer group 300b is a group including each consumer 301 connected to the electric power line 502.

(5.3) Third Modification

In the aforementioned embodiment, the correct devices 100a and 100b corrected the control information, respectively. In the present modification, the correction devices 100a and 100b provided respectively in the consumer groups 300a and 300b can correct the control information by exchanging information between the correction devices 100a and 100b via the communication network 30.

Specifically, each control device 320 notifies the power generation amount information of the photovoltaic cell 311, the remaining battery amount information of the battery 310, and the amount of power consumed in the consumer premise to each of the correction devices 100a and 100b. At this point, the control device 320 configuring the consumer group 300a notifies to the correction device 100a, and the control device 320 configuring the consumer group 300b notifies to the correction device 100b.

Furthermore, based on the received information, each of the correction devices 100a and 100b generates reserve power information indicating the amount of reserve power (how much more power can be supplied) to be supplied by self. Each of the correction devices 100a and 100b exchanges this reserve power information.

In each of the correction devices 100a and 100b, the correction unit 121 includes a common correction normalization function. Specifically, the correction unit 121 generates corrected control information for normalizing the power supplied from the power system 210a based on the reserve power information received from the local correction device and the other correction device, and notifies the corrected control information to the control device 320. At this time, the correction device 100a notifies to the control device 320 configuring the consumer group 300a, and the correction device 100b notifies to the control device 320 configuring the consumer group 300b. Each of the control devices 100a and 100b uses the normalized corrected control information to perform power control.

Hereinafter, an example of the correction method is explained, however, other methods can also be used.

When the control information is the charges information, each of the correction devices 100a and 100b, for example, compares the power generation amount information and the remaining battery amount information when the electricity charges are higher than a predetermined amount, and judges whether the electric power is in excess or shortage. Furthermore, based on the judgment result, each of the correction devices 100a and 100b generates the reserve power information. Each of the correction devices 100a and 100b performs the same judgment and exchanges this information. Furthermore, based on the reserve power information received from the other correction device, each of the correction devices 100a and 100b generates the corrected control information in which the electric power supplied from the power system 210a has been normalized. Furthermore, each of the correction devices 100a and 100b transmits the corrected control information to the control devices 100a and 100b of the consumers configuring the consumer groups 300a and 300b.

Thus, according to the aforementioned control system, it becomes possible to supply the power to the consumer group with a shortage of electric power (for example, the consumer group 300b) from the consumer group with a surplus of electric power (for example, the consumer group 300a), resulting in reduction in the load of the power system 210a and normalization of electric power supply. Furthermore, when the electricity charges are lower than the predetermined amount, the power of the power system 210a is in an abundant state, and therefore, a charging instruction is sent to the consumer group having a large vacant capacity in the battery 310, and the power supply of the power system 210a can be normalized.

Note that if a consumer group exists in which the battery 310 is not provided in the consumer 301 (for example, the consumer group 300b), then in order for each of the correction devices 100a and 100b to receive the supply of power from a consumer group in which the battery 310 is provided in the consumer 301 (for example, the consumer group 300a) in a weather or time zone when the power is not generated by the photovoltaic cell 311, power can be shared between the consumer groups by notifying the corrected control information to the control devices 100a and 100b.

Note that in the aforementioned example, a case in which each of the correction devices 100a and 100b corrects the control information was illustrated, however, the power generation amount information and the remaining battery amount information of each consumer group can be transmitted to the server (not shown in the figure), and the server can generate the corrected control information and notify the same to each correction device.

Furthermore, in the aforementioned example, a case in which two correction devices, that is, correction devices 100a and 100b are provided was explained, however, naturally, three or more correction devices may be provided.

The functions of the correction device according to the above-described embodiment can be applied to various systems, such as HEMS (Home Energy Management System) and BEMS (Building and Energy System), in the smart grid technology.

Thus, it should be understood that the present invention includes various embodiments that are not described herein. Therefore, the present invention is limited only by the specific features of the invention in the scope of the claims reasonably evident from the disclosure above.

The entire contents of Japanese Patent Application No. 2009-272988 (filed on Nov. 30, 2009) are incorporated in the present specification by reference.

INDUSTRIAL APPLICABILITY

As described above, according to the control system, the correction device, and the power control method of the present invention, because appropriate power control can be performed even for a consumer that can make use of dispersed power sources and batteries, the present invention is useful.

The invention claimed is:
1. A control system, comprising:
 a generation device configured to generate control information that is information based on supply and demand of power generated at an electric generation plant, and is used for power control for a plurality of consumers supplied with power generated at the electric generation plant,
 a correction device connected to the generation device and provided to a consumer group, which is a part of the plurality of consumers, the correction device configured to correct the control information generated by the generation device in view of an amount of electric power that can be supplied by at least one of a dispersed power source or a battery that can supply electric power to the consumer group, and a control device provided to each consumer configuring the consumer group and configured to perform power control by a consumer configuring the consumer group-by using the control information corrected by the correction device, wherein the control information includes information indicating electricity prices of the power generated at the electric generation plant, information indicating a suppliable amount of the power generated at the electric generation plant, or information indicating a usable amount of the power for the consumer which is generated at the electric generation plant.

2. The control system according to claim 1, wherein the consumer group is formed by consumers belonging to a same region, or consumers connected to a same electric feeder line.

3. The control system according to claim 1, wherein the control device performs power control for each consumer or each load.

4. The control system according to claim 1, wherein the consumer group is formed by consumers sharing a same battery.

5. The control system according to claim 1, wherein
the control information is the information indicating the electricity prices, and
the correction device corrects to decrease the electricity prices when the amount of electric power that can be supplied by at least one of the dispersed power source and the battery is more than a predetermined threshold.

6. The control system according to claim 1, wherein
the control information is the information indicating the suppliable amount of the power, and
the correction device corrects to increase the suppliable amount of the power when the amount of electric power that can be supplied by at least one of the dispersed power source and the battery is more than a predetermined threshold.

7. The control system according to claim 1, wherein
the control information is the information indicating the usable amount of the power, and
the correction device corrects to increase the usable amount of the power when the amount of electric power that can be supplied by at least one of the dispersed power source and the battery is more than a predetermined threshold.

8. A correction device, comprising:
a reception unit configured to receive from a generation device control information that is information based on supply and demand of power generated at an electric generation plant, and is used for power control for a plurality of consumers supplied with power generated at the electric generation plant,
a correction unit connected to the generation device and provided to a consumer group, which is a part of the plurality of consumers, the correction unit being configured to correct the control information received by the reception unit in view of an amount of electric power that can be supplied by at least one of a dispersed power source and a battery that can supply electric power to the consumer group, and
a transmission unit configured to transmit the control information corrected by the correction unit to a control device performing power control by a consumer configuring the consumer group.

9. A power control method, comprising:
a step of generating control information by a generation device, wherein the control information is information based on supply and demand of power generated at an electric generation plant, and is used for power control for a plurality of consumers supplied with the power generated at the electric generation plant,
a step of correcting the control information generated in the generating step by a correction device connected to the generation device and provided to a consumer group, which is a part of the plurality of consumers, in view of at least one of a dispersed power source or a battery that can supply electric power to the consumer group, and
a step of performing power control by a control device by a consumer configuring the consumer group by using the control information corrected in the correcting step,
wherein the control information includes information indicating electricity prices of the power generated at the electric generation plant, information indicating a suppliable amount of the power generated at the electric generation plant, or information indicating a usable amount of the power for the consumer which is generated at the electric generation plant.

\* \* \* \* \*